United States Patent [19]

Mirza

[11] 4,235,187
[45] * Nov. 25, 1980

[54] CAN HANDLING EQUIPMENT
[75] Inventor: Rohinton M. Mirza, Union City, N.J.
[73] Assignee: Metalwash Machinery Corp., Elizabeth, N.J.
[*] Notice: The portion of the term of this patent subsequent to Mar. 18, 1997, has been disclaimed.
[21] Appl. No.: 956,461
[22] Filed: Oct. 30, 1978

Related U.S. Application Data
[63] Continuation-in-part of Ser. No. 925,491, Jul. 12, 1978.
[51] Int. Cl.² .................. B05C 9/12; B05C 11/02; B08B 3/08; B65G 49/02
[52] U.S. Cl. ........................................ 118/58; 118/56; 118/73; 118/423; 118/426; 134/66; 134/67; 134/73; 134/128; 198/342; 198/688; 198/699; 427/235; 427/331; 427/336; 427/430.1; 427/435
[58] Field of Search ............... 118/56, 73, 423, 426, 118/58; 134/126, 128, 67, 73, 66; 198/688, 698, 342; 427/235, 331, 336, 352, 430 R, 435, 444

[56] References Cited
U.S. PATENT DOCUMENTS

| 1,354,553 | 10/1920 | Harter | 198/688 |
| 1,809,054 | 6/1931 | Mattison | 198/688 |
| 2,282,898 | 5/1942 | Snader | 427/235 |
| 2,411,042 | 11/1946 | King | 118/118 X |
| 2,807,203 | 9/1957 | Buechele | 134/126 X |
| 3,168,413 | 2/1965 | Harrison | 118/56 X |
| 3,895,982 | 7/1975 | Persson | 198/688 X |
| 3,952,698 | 4/1976 | Beyer | 118/314 |
| 3,993,086 | 11/1976 | Nellen | 134/67 X |
| 4,009,050 | 2/1977 | Beyer | 134/66 |
| 4,020,198 | 4/1977 | Cornelius | 427/336 |

Primary Examiner—Dennis L. Albrecht
Attorney, Agent, or Firm—A. C. Nolte, Jr.; Edward B. Hunter

[57] ABSTRACT

In can manufacturing apparatus there is provided an overhead magnetic conveyor for transferring cans from a conveyor upon which they are coated to a conveyor upon which the cans are dried. To remove excess coating material which tends to form a bead around the lower most edge of a can, a bath of coating material solvent is disposed adjacent to the transfer conveyor and has within it an endless belt conveyor to which cans on the overhead conveyor are caused to fall and from which those cans are subsequently returned to the overhead conveyor. The upper, can carrying course of the endless belt conveyor is disposed at a predetermined depth below the surface of solvent within the cans so that excess material accumulating on the lower portions of the cans in the coating region is removed prior to entry of the cans into the drying oven.

8 Claims, 5 Drawing Figures

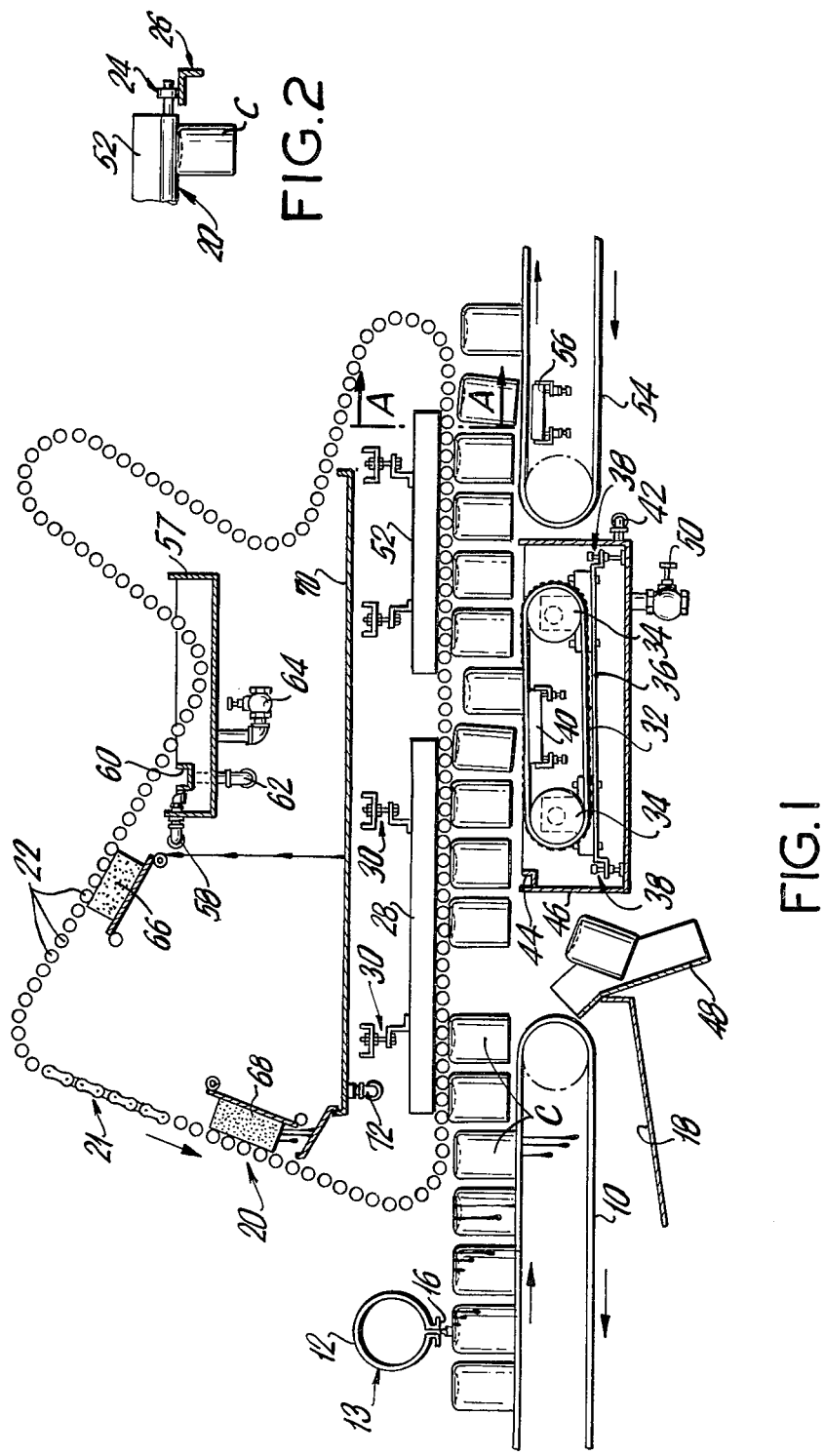

CAN HANDLING EQUIPMENT

REFERENCE TO RELATED APPLICATION

This is a continuation-in-part of application Ser. No. 925,491, filed July 17, 1978.

BACKGROUND OF THE INVENTION

This invention is concerned with can handling equipment and particularly is concerned with equipment for manufacturing cans. Typical can handling equipment used in the manufacture of cans is described in Beyer's U.S. Pat. No. 3,952,698. During the manufacture of cans, the can bodies have a lubricant applied to them to assist in the shaping processes and in the other body formation steps. Thereafter, the formed bodies are delivered to a washing and coating equipment such as, for example, that described in the aforementioned Beyer patent.

It is conventional to coat with the interior and exterior surfaces of the can bodies. The interior surface is coated so that the contents of the can are prevented from reacting with the material of the can and the exterior of the can is commonly coated to provide a surface receptive to printing inks so that promotional and other information can be printed on the exterior surface of the cans.

After the can bodies are coated they are filled and a closure is then applied to the open end of the can bodies and the edges of the open end of the can bodies are necked and flanged to close the container. The washing and coating operations are performed with the can bodies in an inverted position, i.e., with the open ends lowermost. This particular orientation is used for the obvious reason that in the coating and washing operations, were the open end of the can uppermost, the interior of the cans would become filled with the washing and coating material.

As a result of this particular orientation of the cans, in the coating stages a bead of excess material tends to form around the lowermost edges of the cans as the coating material, under the influence of gravity, moves down the surfaces of the cans. This bead of material can interfere with the flanging and necking operations and can be unsightly. The present invention is concerned with avoiding the formation of such beads upon can bodies.

The most pertinent art of which applicant is aware is that constituted by U.S. Pat. No. 4,009,050 (Beyer et al). In that structure, cans carried upon an upper course of a conveyor upon which coating occurs are passed to a conveyor constituted by a plurality of driven rollers which together define a course for the cans through a bath of solvent so that the lowermost edges of the cans dip below the surface of the solvent and the bead of excess coating material is thus removed. Thereafter, the course moves upwardly from the bath and the cans are delivered from the end of the roller conveyor to a conveyor upon which the coatings are cured or dried.

Other pertinent prior art is represented by U.S. Pat. No. 4,020,198 issued Apr. 26, 1977 to Cornelius et al. That patent shows an overhead transfer conveyor for transferring cans from a belt conveyor upon which the cans are coated to another belt conveyor upon which they are dried. In between the coating and the drying conveyors there is a bath of a solvent and the overhead conveyor dips downwardly towards the bath to bring the lowermost edges of the cans carried by that transfer conveyor into contact with the solvent within the bath in this way to remove the bead of excess coating material.

The present invention seeks to provide an improved system for removal of the bead of excess coating material which forms on the lowermost edges of cans. Particularly, it seeks to provide a system which is effective not only for use with relatively narrow conveying belt systems but also is useful for a wide conveyor.

BRIEF SUMMARY OF THE INVENTION

According to the present invention, there is provided a first conveyor upon which cans are coated, a second conveyor on which the coated cans are dried and an overhead magnetic transfer conveyor effective to move cans from the first to the second conveyor. Below the overhead transfer conveyor and between the first and second conveyors there is disposed a bath of solvent and within that bath an endless belt conveyor is disposed with its upper course at a predetermined depth below the surface of solvent contained within the bath. Cans are caused to fall from the transfer conveyor to the endless belt conveyor within the bath and are then returned from the conveyor within the bath to the overhead transfer conveyor so that the transfer of the can bodies from the first to the second conveyors can be completed.

Most desirably the submerged conveyor, which is short relative to its width, is specially selected so that tracking problems are substantially eliminated. Additionally, the can contacting surface of that belt is so designed that slippage of the cans, particularly at the point of delivery of the cans to the belt is eliminated or very substantially reduced.

DESCRIPTION OF THE DRAWINGS

An embodiment of the present invention is illustrated in the accompanying drawings in which:

FIG. 1 is a schematic side view of equipment according to the present invention;

FIG. 2 is a detail taken on line a—a of FIG. 1;

DESCRIPTION OF THE PREFERRED EMBODIMENTS OF THE INVENTION

Figure 3:
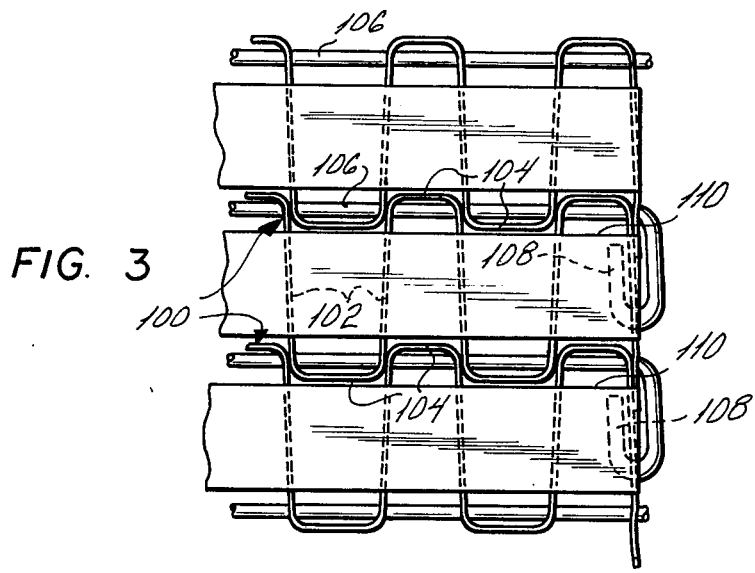
FIG. 3 is a plan view of a section of the submerged belt of FIG. 1.

The equipment in the drawings forms a part of a continuous can production line, the parts of that line upstream and downstream of the equipment in the drawings being of any appropriate and desired form.

From can washing equipment immediately upstream of the equipment in the drawings the cans C are delivered to an endless mesh belt conveyor 10 to be carried on the upper course thereof through a coating station (not shown). The coating station is one in which a coating is applied to both the interior and exterior surfaces of the can but it will be recognized from the description that follows that the equipment herein can be utilized with effect with cans which are coated both on the interior and exterior or on the interior alone or on the exterior alone. The cans C are of conventional form having a dished bottom in which a pool of coating material collects in the coating stage. This pool of material is removed as the cans pass a pneumatic blow-off unit indicated generally at 12 and comprising a transversely extending duct 13 with a downwardly directed nozzle 16 from which a continuous ribbon of air issues to blow the solvent from the dished bottoms of the can bodies. The solvent falls to a collection trough indicated generally at 18 to be re-used if desired.

From the conveyor 10 the cans are picked up by a transfer conveyor unit indicated generally at 20. The transfer conveyor unit 20 comprises an endless belt 21 made up of a plurality of transversely extending rod members 22 extending between spaced apart chains which are trained around appropriate guide and drive rolls omitted from the drawings in the interest of clarity. The end regions of the individual rod elements are of reduced diameter, extend beyond the associated chains and are provided with rollers 24 which are, over the lower can carrying course of the conveyor, supported upon longitudinally extending guide rails 26 (see FIG. 2). Behind the conveyor belt there is disposed a longitudinally extending permanent magnet 28 which has a width equal to that of the conveyor. The position of the magnet can be adjusted by means of screw thread elements 30 so that interaction of the magnet and the can bodies can be adjusted for effective pick up and drop off of cans carried on the conveyor. It is to be noted that by providing adjusting elements at locations spaced apart in the direction of travel of the belt, the magnet can be adjusted for spacing from the belt by operating the elements 30 in unison and also the azimuth of the magnet can be adjusted because of the availability of independent operation of the adjusting elements. In this way the location at which the cans are released can be exactly determined.

From the conveyor 21, in a region adjacent to that end of magnet 28 most remote from belt 10, the cans are caused to fall to the upper course of a belt conveyor 32 disposed within a bath of solvent. The belt of conveyor 32 is trained around end drums 34 which are mounted on a base frame structure 36 which is adjustable by means of screw threaded elements 38 so that the disposition of the upper course of the belt within the bath can be varied.

Beneath the upper, can carrying course of the conveyor 32, there is disposed a permanent magnet 40 which is effective positively to guide the can bodies leaving the adjacent end region of magnet 28 straight down to the conveyor within the bath and to be steadied on that convyor. The magnet is also effective to minimize the time that the cans are in free fall. As with magnet 28, means are provided for adjusting the spacing of magnet 40 from the can carrying course of conveyor 32 and for adjusting the azimuth of the magnet.

It is to be noted that the conveyor 32 is driven by a motor means external to the bath. Additionally, the bath is provided with a fill line as at 42 and an overflow trough 44 to maintain the level of solvent within that bath, constant. During normal operation, the fill line is open so that the solvent is constantly replaced in this way to avoid too great a level of concentration of the coating material within the solvent. As desired for maintenance and cleaning, the bath can be emptied by means of drain valve 50.

It should also be noted that the end wall 46 of the bath is spaced from the discharge end of conveyor 10. This is a significant feature since it permits the segregation of tipped cans from those which remain upright on conveyor 10. It will be appreciated that the tipped cans will not be lifted to the conveyor 20 by magnet 28 and therefore will fall from the discharge end of conveyor 10 to a chute 48 to be recycled. In this way, the tipping of further cans on a domino-like basis is prevented.

The conveyor 32 may be disposed to incline upwardly so that a taper of the amount of coating remaining on the can sides is achieved.

From the upper course of belt 32, the cans are returned to belt 20 by means of a second permanent magnet 52. The magnet 52 is adjustable in the same manner as is magnet 28 so that the pick-up and release points of the cans can be exactly adjusted. The cans then are conveyed in a suspended attitude, to the receiving end of a conveyor 54 upon the upper course of which the cans are carried through a drying oven. To ensure positive guidance of the cans as they fall from conveyor 20 a permanent magnet 56 is disposed beneath the can carrying course of belt 54 in the region where transfer from the overhead conveyor to conveyor 54 is to be effected. The magnet also minimizes the time the cans are in free fall.

After detachment of the can bodies, the conveyor 20 is caused to follow a path such that it dips into a wash tank 57 which has a fill inlet 58, a constant level overflow trough 60 leading to overflow line 62 and a drain valve 64 by which, for cleansing and maintenance the tank can be drained. As with the bath fed by fill line 42, the fill inlet 58 is open during normal operation to maintain the concentration level of coating material in the solvent, low. The conveyor then passes over wiping units indicated at 66 and 68. The wash tank is effective to remove solvent from the conveyor which may be transferred to it from the cans and the wiper units are effective to wipe the solvent from tank 57 from the rods so that the solvent is not applied to the cans as they are picked up subsequently by the rods of the conveyor.

Disposed beneath the upper courses of the conveyor 20 is a trough or drip pan 70 with a drain line 72 which collects coating and solvent material falling from the rods of the belt and prevents that material from falling upon the cans below.

It will be appreciated that the equipment of the present invention will provide effective transfer of cans from the conveyor upon which they are coated to the conveyor upon which the coating is dried and in that process will both separate out tipped cans from those which remain erect and will remove the bead of excess material accumulating on the can rim from the coating process. Additionally, by the adoption of the particular form of conveyor for the transfer of the cans, i.e. the rod like structure, the contact area between the cans and the belt is minimized. The spacing of the rods of the conveyor is such that the cans are carried in a vertical, stable attitude. In general, this means that the spacing of the rods is slightly less than one half of a can diameter. With this type of spacing and with conventional can bodies having a concave bottom surface a maximum of six points of contact between the can and conveyor will occur and thus the number of potential flaws in the can coating on the bottom surface is minimized. Further, the deflection of the conveyor across its transverse dimension is minimized so that wide conveyor belts of up to say eight feet can be utilized according to the present invention. Also, by guiding and supporting the rods on rails 26 longitudinal deflection of the conveyor is minimized.

By arranging the conveyor within the bath of solvent, one is, of course, able accurately to maintain the level to which the cans are dipped quite independently of the position of the overhead transfer belt which, of course, is of considerable significance, since, if the cans are dipped to too great an extent, the integrity of the coating in the rim region cannot be guaranteed and if the cans are not dipped sufficiently, then the bead of excess material may not be completely removed or may reform as further coating material from upper regions of the can bodies moves down towards the rim.

If desired, it is possible to arrange that the speed of conveyors 10, 20 and 54 be progressively faster by a small amount so that spacing of the cans during transfer is effected.

Figure 4:
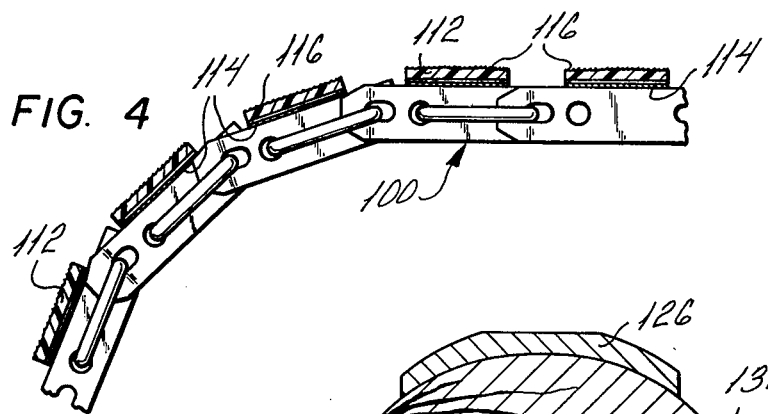
FIG. 4 is a side view of the belt section of FIG. 3.
Figure 5:
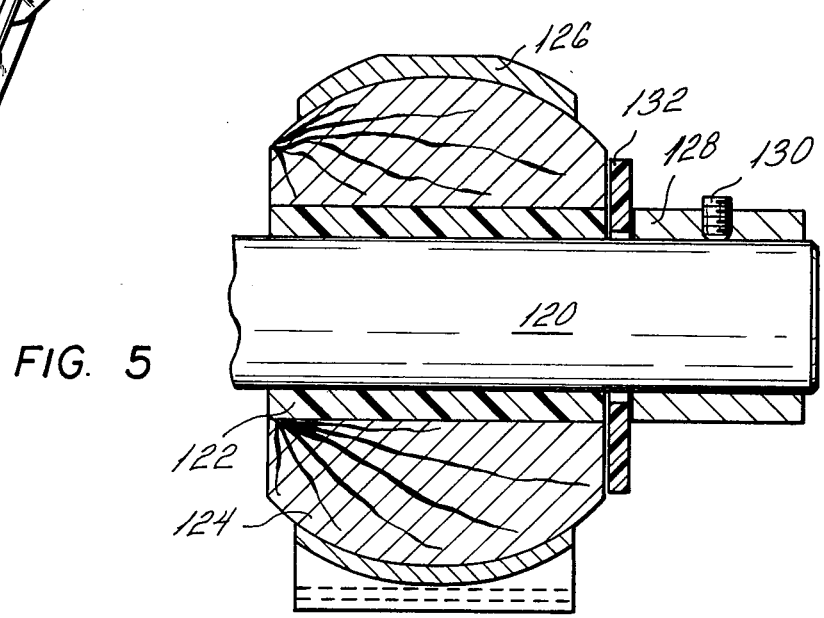
FIG. 5 is a detail of a bearing structure of the belt of FIGS. 3 and 4.

A particularly desirable embodiment of the submerged belt 32 is illustrated in FIGS. 3 through 5. Essentially the belt of the conveyor comprises a plurality of flat wire strips 100 extending transversely of the belt and of generally square wave form having alternating longitudinally extending sections 102 and transverse interconnecting sections 104. The flat wire strips are interconnected by transversely extending rods 106 which pass through aligned holes in the longitudinally extending sections 102 of the strips. The regions of the rods at the longitudinal edges of the belt are turned back upon themselves as at 108 and are engaged upon appropriate openings in the outer-most ones of the longitudinally extending sections 102 of the strips 100. In this way the strips are assembled into an endless belt.

Tack welded to the edges of the strips 100, to constitute an outer, can contacting surface of the conveyor belt are a plurality of the stainless steel slats 110. Alternatively to tack welding the slats may be provided with connecting tabs folded about the longitudinally extending sections 102 of the strips 100.

Secured on the surface of the slats most remote from their connection to the flat strips 100 and as can be seen particularly in FIG. 4, there are shoe elements 112 those elements being connected to the individual slats by an adhesive indicated at 114.

The frictional shoe material, specifically a urethane, can have a rough surface 116 for cooperation with the edges of cans falling to the belt so that slippage of the cans particularly at the point of delivery of the cans to that belt is eliminated or at least very substantially reduced. It will be appreciated that the can edge resting upon the surface is rather narrow and thus will in certain areas engage in the valleys between the many protrusions upon the surface of those shoes to provide a positive interengagement of the can body and conveyor.

The belt conveyor 32 is most desirably driven by sprockets mounted upon end shafts one of which is shown at 120 in FIG. 5. The sprockets are such that the teeth engage between the longitudinally extending sections 102 of the wires making up the belt and by interengagement of the side surfaces of those teeth with sections 102 of the wires restrict lateral movement of the belt to a minimum. Most desirably for example where an 8 foot wide conveyor is used, there are some 16 sprockets spaced along the shaft. Without the interengagement of these sprockets with the wires and in view of the fact that a wide conveyor is adopted and one which is relatively short, the achievement of accurate tracking would be difficult.

The shaft 120 is mounted in bearings which comprise a delrin bushing 122 which is press fitted into a wooden ball 124 received within an appropriate bearing support bracket 126. The adoption of this type of structure permits the assembly of the framework and the conveyor to the framework to be completed with relatively large tolerances, the engagment of the ball and the bearing housing supported by the framework accomodating the minor inaccuracies by permitting the shaft about which the belt is trained to adopt an optimum tracking position.

The ball is fixed to the shaft by means of a coller 128 which in turn is secured to the shaft by a set screw 130. Interposed between coller 128 and the ball is a low friction, delrin washer 132.

It has been found that by the adoption of this belt the stability of the can bodies falling to the conveyor from transfer conveyor 20 is improved as is the frictional transfer and that tracking problems, resulting from the utilization of a wide but short belt, are substantially reduced.

What is claimed is:

1. Can handling equipment comprising a coating station at which a coating is applied to can bodies, a drying station at which said coating is dried, and overhead transfer conveyor for transferring can bodies from said coating station disposed between said coating and drying stations and comprising a receptacle for containing a coating solvent, and endless belt conveyor having an upper, can carrying course disposed within said receptacle at a level such that the lower portions of can bodies supported thereon are dipped below the level of said solvent, said endless belt conveyor comprising means preventing slippage between cans delivered to the conveyor and the belt contacting surface thereof, and means causing can bodies to fall from said overhead transfer conveyor to said endless belt conveyor and to be returned from said endless belt conveyor to said overhead transfer conveyor.

2. Equipment as claimed in claim 1 wherein means preventing slippage comprises rough surfaced elements secured to the belt contacting surface of the belt conveyor.

3. Equipment as claimed in claim 2 wherein said belt of said endless belt conveyor comprises a plurality of transversely extending slats each said slat being provided with a covering element.

4. Equipment as claimed in claim 3 wherein said slats are secured to edge surfaces of a plurality of transversely extending wave-form flat wire strips said strips being connected to each other by transversely extending rods passing through aligned openings in said wires.

5. Equipment as claimed in claim 3 wherein said elements are of a urethane having a roughened, can contacting surface.

6. Equipment as claimed in claim 1 wherein end rollers of said endless belt conveyor are mounted in spherical bearings.

7. Can handling equipment for removing with solvent a bead of excess coating material from the lowermost edges of cans which comprises a receptacle for containing the solvent, an endless belt conveyor having an upper can carrying course disposed within said receptacle, and means for controlling the level of the solvent in the receptacle and for controlling the disposition of the upper course of the belt in the receptacle so that only the beaded lowermost portions of the cans are immersed therein.

8. Equipment as claimed in claim 7 wherein said endless belt conveyor comprises a belt formed of a plurality of interconnecting, transversely extending slats, said slats being provided with can contacting shoe having a can contacting surface of roughened texture.

* * * * *